US010248250B2

(12) United States Patent
Geng et al.

(10) Patent No.: US 10,248,250 B2
(45) Date of Patent: Apr. 2, 2019

(54) HAPTIC COMMUNICATION APPARATUS, INTEGRATED TOUCH SENSING AND SIMULATING APPARATUS AND METHOD FOR HAPTIC COMMUNICATION

(71) Applicant: BOE TECHNOLOGY GROUP CO., LTD., Beijing (CN)

(72) Inventors: Lihua Geng, Beijing (CN); Yongbo Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/550,597

(22) PCT Filed: Mar. 13, 2017

(86) PCT No.: PCT/CN2017/076426
§ 371 (c)(1),
(2) Date: Aug. 11, 2017

(87) PCT Pub. No.: WO2017/197967
PCT Pub. Date: Nov. 23, 2017

(65) Prior Publication Data
US 2018/0232094 A1   Aug. 16, 2018

(30) Foreign Application Priority Data
May 17, 2016 (CN) .......................... 2016 1 0326129

(51) Int. Cl.
*G06F 3/041* (2006.01)
*G06F 3/01* (2006.01)
*G06F 3/0488* (2013.01)

(52) U.S. Cl.
CPC ............ *G06F 3/0416* (2013.01); *G06F 3/016* (2013.01); *G06F 3/0414* (2013.01); *G06F 3/0488* (2013.01)

(58) Field of Classification Search
CPC .. G06F 3/016; G06F 2203/014; G06F 3/0414; G08B 6/00; G09B 21/003; A63F 13/285
See application file for complete search history.

(56) References Cited

U.S. PATENT DOCUMENTS 6,229,230 B1 *  5/2001  Wing ...................... H04Q 9/00
                                                          273/148 R
6,491,649 B1 * 12/2002  Ombrellaro ............ A61B 5/103
                                                          600/587
(Continued)

FOREIGN PATENT DOCUMENTS

CN          1688252 A    10/2005
CN        101452339 A     6/2009
(Continued)

OTHER PUBLICATIONS

International Search Report & Written Opinion dated May 31, 2017, regarding PCT/CN2017/076426.
(Continued)

*Primary Examiner* — Koosha Sharifi-Tafreshi
(74) *Attorney, Agent, or Firm* — Intellectual Valley Law, P.C.

(57) ABSTRACT

The present application discloses a haptic communication apparatus including a touch simulation device comprising a first controller and a first actuator coupled to each other; and a data receiver communicatively coupled to the touch simulation device and configured to receive a first touch command signal associated with simulating a touch on the touch simulation device. The first controller is configured to receive the first touch command signal from the data receiver and control the first actuator to simulate the touch on the touch simulation device in response to the first touch command signal; the first actuator comprises a plurality of touch simulating elements; the first controller is coupled to each of the plurality of touch simulating elements aid configured to provide a plurality of touch simulating signals respectively to the plurality of touch simulating elements.

17 Claims, 7 Drawing Sheets

(56) References Cited

U.S. PATENT DOCUMENTS

| | | | | |
|---|---|---|---|---|
| 6,639,582 B1* | 10/2003 | Shrader | ............... | G06F 3/016 345/156 |
| 7,098,776 B2* | 8/2006 | Chang | ............... | G06F 1/1626 340/407.1 |
| 7,245,292 B1* | 7/2007 | Custy | ............... | G06F 3/011 178/18.01 |
| 8,294,557 B1* | 10/2012 | El Saddik | ............... | G06F 3/016 340/407.1 |
| 2008/0231594 A1* | 9/2008 | Hardwick | ............... | A63F 13/12 345/156 |
| 2009/0150802 A1 | 6/2009 | Do et al. | | |
| 2010/0085168 A1* | 4/2010 | Kyung | ............... | G06F 3/016 340/407.1 |
| 2010/0141407 A1 | 6/2010 | Heubel et al. | | |
| 2010/0152545 A1 | 6/2010 | Ramsay et al. | | |
| 2011/0199321 A1* | 8/2011 | Kyung | ............... | G06F 1/1684 345/173 |
| 2014/0088941 A1 | 3/2014 | Banerjee et al. | | |
| 2014/0313142 A1* | 10/2014 | Yairi | ............... | G06F 3/016 345/173 |
| 2015/0253848 A1 | 9/2015 | Heubel et al. | | |
| 2015/0381920 A1 | 12/2015 | Guo | | |

FOREIGN PATENT DOCUMENTS

| | | |
|---|---|---|
| CN | 101847315 A | 9/2010 |
| CN | 102246120 A | 11/2011 |
| CN | 103616951 A | 3/2014 |
| CN | 103957440 A | 7/2014 |
| CN | 205788095 U | 12/2016 |
| WO | 2004037084 A1 | 5/2004 |

OTHER PUBLICATIONS

First Office Action in the Chinese Patent Application No. 201610326129.0, dated Apr. 20, 2018; English translation attached.

* cited by examiner

HAPTIC COMMUNICATION APPARATUS, INTEGRATED TOUCH SENSING AND SIMULATING APPARATUS AND METHOD FOR HAPTIC COMMUNICATION

CROSS-REFERENCE TO RELATED APPLICATION

This application is a national stage application under 35 U.S.C. § 371 of International Application No. PCT/CN2017/076426 filed Mar. 13, 2017, which claims priority to Chinese Patent Application No. 201610326129.0, filed May 17, 2016, the contents of which are incorporated by reference in the entirety.

TECHNICAL FIELD

The present invention relates to haptic communication technology, more particularly, to a haptic communication apparatus, an integrated touch sensing and simulating, and a method for haptic communication.

BACKGROUND

Haptic communication refers to the ways in which people communicate and interact via a sense of touch. Haptic communication is a nonverbal and nonvisual communication, it provides information about surfaces, textures, and forces of the touch. Haptic communication is an important component of communication in interpersonal relationships. For example, touch is extremely important for humans and is vital in conveying physical intimacy.

SUMMARY

In one aspect, the present invention provides a haptic communication apparatus, comprising a touch simulation device comprising a first controller and a first actuator coupled to each other; and a data receiver communicatively coupled to the touch simulation device and configured to receive a first touch command signal associated with simulating a touch on the touch simulation device; wherein the first controller is configured to receive the first touch command signal from the data receiver and control the first actuator to simulate the touch on the touch simulation device in response to the first touch command signal; the first actuator comprises a plurality of touch simulating elements; the first controller is coupled to each of the plurality of touch simulating elements and configured to provide a plurality of touch simulating signals respectively to the plurality of touch simulating elements; and each of the plurality of touch simulating elements comprises a first terminal and a second terminal, a distance between the first terminal and the second terminal capable of being actuated between a first value and a second value in response to one of the plurality of touch simulating, signals, the second value being larger than the first value.

Optionally, the haptic communication apparatus further comprises a touch sensing device configured to detect a touch signal and, a touch position information and convert the touch signal and the touch position information into the first touch command signal; a data transmitter communicatively coupled to the touch sensing device and configured to receive the first touch command signal from the touch sensing device; and a communication interface configured to establish a communication link between the data receiver and the data transmitter; wherein the touch sensing device and the touch simulation device are configured to be connected to a computer network; the data transmitter is configured to communicate the first touch command signal to the data receiver via the communication link; and the touch sensing device comprises a plurality of first sensors, and a first processor coupled to each of the plurality of first sensors and configured to acquire a plurality of touch signals respectively front the plurality of first sensors and a plurality of touch positions respectively corresponding to the plurality of touch signals.

Optionally, the plurality of touch signals are a plurality of virtual touch signals; the touch sensing device comprises a plurality of virtual touch sensors, each of which is configured to detect a virtual touch and generate a virtual touch signal; and the first processor is coupled to each of the plurality of virtual touch sensors and configured to acquire the plurality of virtual touch signals respectively from the plurality of virtual touch sensors and a plurality of virtual touch positions respectively corresponding to the plurality of virtual touch signals.

Optionally, the plurality of touch signals are, a plurality of touch pressure signals; the touch sensing device comprises a plurality of pressure sensors, each of which is configured to detect a pressure applied thereon and generate a touch pressure signal; and the first processor is coupled to each of the plurality of pressure sensors and configured to acquire the plurality of touch pressure signals respectively from the plurality of pressure sensors and the plurality of touch positions respectively corresponding to the plurality of touch pressure signals.

Optionally, each of the plurality of pressure sensors comprises a pressure receiving surface and is configured to detect a pressure applied on the pressure receiving surface in real time; and the first processor is configured to acquire the plurality of touch pressure signals and the plurality of touch positions periodically at time intervals.

Optionally, the touch sensing device further comprises a first base substrate; and a second base substrate; wherein the plurality of the pressure sensors are between the first base substrate and the second base substrate; each of the plurality of pressure sensors comprises a pressure receiving surface and is configured to detect a pressure applied on the pressure receiving surface; and the pressure receiving surface of each of the plurality of pressure sensors is in contact with the first base substrate.

Optionally, the touch sensing device further comprises an elastic material layer on a side of the first base substrate distal to the second base substrate.

Optionally, the elastic material layer comprises a silicone layer.

Optionally, the touch sensing device further comprises a first pressure transferring layer comprising a plurality of first pressure transferring pads between the first base substrate and the elastic material layer; and each of the plurality of first pressure transferring pads on a side of the pressure receiving surface of one of the plurality of pressure sensors proximal to the first base substrate.

Optionally, the plurality of first pressure transferring pads are made of a rubber material.

Optionally, the plurality of touch simulating elements respectively correspond to the plurality of first sensors; and a position of each of the plurality of touch simulating elements in the touch simulation device corresponds to a position of one of the plurality of first sensors in the touch sensing device.

Optionally, the touch sensing device further comprises a framing logic coupled to the first processor and the data transmitter and configured to frame the plurality of touch signals respectively from the plurality of first sensors acquired by the first processor into the first touch command signal having a frame structure, and transmit the first touch command signal to the data transmitter.

Optionally, the first touch command signal having a frame structure comprises a frame start flag field, a frame identifier field, a group of the plurality of touch simulating signals, a frame check sequence field, and a frame end flag field, the group of the plurality of touch simulating signals comprising the plurality of touch simulating signals in a consecutive order.

Optionally, the touch simulation device further comprises a third base substrate, a fourth base substrate, and an actuator layer comprising the plurality of touch simulating, elements between the third base substrate and the fourth base substrate; the first terminal of each of the plurality of touch simulating elements is coupled to the third base substrate; the second terminal of each of the plurality of touch simulating elements is fixedly positioned with respect to the fourth base substrate; and the third base substrate is an elastic base substrate and is capable of undergoing deformation in response to a change in the distance between the first terminal and the second terminal.

Optionally, the third base substrate comprises a silicone material.

Optionally, each of the plurality of touch simulating elements comprises a first portion having a first end and a second end, and a second portion having a third end and a fourth end; the first end of the first portion corresponds to the first terminal of each of the plurality of touch simulating elements; the fourth end of the second portion corresponds to the second terminal of each of the plurality of touch simulating elements; the second end of the first portion and the third end of the second portion are between the first end of the first portion and the fourth end of the second portion; and a distance between the second end of the first portion and the third end of the second portion capable of being actuated between a third value and a fourth value in response to the corresponding one of the plurality of touch simulating signals, the fourth value being larger than the third value.

Optionally, the second end of the first portion and the third end of the second portion are in contact with each other absent the first touch command signal from the first controller, and the third value is substantially zero.

Optionally, the first touch command signal is an electrical signal; the first portion comprises a magnetic portion, two ends of the magnetic portion corresponding to the first end and the second end of the first portion; the second portion is an electromagnet comprising a core and a coil surrounding the core, two ends of the core corresponding to the third end and the fourth end of the second portion; the coil is electrically connected to the first controller; and the second end of the magnetic portion and the third end of the core have a same magnetic polarity upon receiving one of the plurality of touch simulating signals from the first controller.

Optionally, the touch simulation device further comprises a retaining layer comprising a plurality of retaining portions, each of which having a through-hole allowing the first portion of one of the plurality of touch simulating elements to extend through the through hole and be movable relative to the through-hole along a direction substantially parallel to a central axis of the through-hole in response to the corresponding one of the plurality of touch simulating signals.

Optionally, the touch simulation device further comprises a second pressure transferring layer comprising a plurality of second pressure transferring pads between the third base substrate and the actuator layer; and each of the plurality of second pressure transferring pads on a side of the first end of the first portion of one of the plurality of touch simulating elements proximal to the third base substrate.

Optionally, the plurality of second pressure transferring pads are made of a rubber material.

Optionally, the first touch command signal has a frame structure; and the touch simulation device further comprises a deframing logic coupled to the first controller and the data receiver and configured to deframe the first touch command signal received by the data receiver to obtain the plurality of touch simulating signals and transmit the plurality of touch simulating signals to the first controller.

Optionally, the first touch command signal has a frame structure and comprises a plurality of frames of touch simulating signals; each of the plurality of frames comprises a frame start flag field, a frame identifier field, a group of the plurality of touch simulating signals, a frame check sequence field, and a frame end flag field, the group of the plurality of touch simulating signals comprising the plurality of touch simulating signals in a consecutive order; the deframing ionic comprises a determination sub-logic configured to detect a corrupted data in each of the plurality of frames based on the frame check sequence field; and the deframer logic further comprises a deframing sub-logic configured to discard a frame of touch simulating signals based on a determination that the corrupted data is detected in the frame of touch simulating signals, and deframe signals in the frame of touch simulating signals based on a determination that the corrupted data is absent in the frame of touch simulating signals.

Optionally, the touch simulation device is capable of detecting a touch signal and convert the plurality of touch signals into a second touch command signal, the touch simulation device further comprises a plurality of second sensors, and a second processor coupled to each of the plurality of second sensors and configured to acquire a plurality of touch signals respectively from the plurality of second sensors and a plurality of touch positions respectively corresponding to the plurality of touch signals; and the data receiver is a data transceiver communicatively coupled to the plurality of second sensors and configured to receive the second touch command signal from the touch simulation device, and communicate the second touch command signal via the communication link.

Optionally, the touch sensing device is capable of simulating a touch on the touch sensing device and further comprises a second controller and a second actuator coupled to each other; the data transmitter is a data transceiver communicatively coupled to the second controller and configured to receive a second touch command signal associated with simulating the touch on the touch sensing device; the second controller is configured to receive the second touch command signal from the data transceiver and control the second actuator to simulate the touch on the touch sensing device in response to the second touch command signal.

In another aspect, the present invention provides an integrated touch sensing and simulating apparatus comprising an integrated touch sensing and simulating device configured to detect a touch signal and a touch position information, convert the touch signal and the touch position information into an outgoing touch command signal, and simulate a touch; a data transmitter communicatively coupled to the integrated touch sensing and simulating device and configured to receive the outgoing touch command signal from the integrated touch sensing and simulating device and communicate the outgoing touch command signal via a communication link; and a data receiver communicatively coupled to the integrated touch sensing and simulating device and configured to receive an incoming touch command signal associated with simulating a touch on the touch simulation device; wherein the integrated touch sensing and simulating device comprises a plurality of first sensors; a first processor coupled to each of the plurality of first sensors and configured to acquire a plurality of touch signals respectively from the plurality of first sensors and a plurality of touch positions respectively corresponding to the plurality of touch signals; a first actuator comprising a plurality of touch simulating, elements; a first controller configured to receive the incoming touch command signal from the data receiver and control the first actuator to simulate the touch on the integrated touch sensing and simulating device in response to the incoming touch command signal, the first actuator and the first controller coupled to each other; the first controller is coupled to each, of the plurality of touch simulating elements and configured to provide a plurality of touch simulating signals respectively to the plurality of touch simulating elements; and each of the plurality of touch simulating elements comprises a first terminal and a second terminal, a distance between the first terminal and the second terminal capable of being actuated between a first value and a second value in response to a corresponding one of the plurality of touch simulating signals, the second value being larger than the first value.

Optionally, the integrated touch sensing and simulating device further comprises a framing logic coupled to the first processor and the data transmitter and configured to frame the plurality of touch signals respectively from the plurality of first sensors acquired by the first processor into the outgoing touch command signal having a frame structure, and transmit the outgoing touch command signal to the data transmitter; and a deframing logic coupled to the first controller and the data receiver and configured to deframe the incoming touch command signal received by the data receiver to obtain the plurality of touch simulating signals and transmit the plurality of touch simulating signals to the first controller.

Optionally, the plurality of first sensors and the plurality of touch simulating elements are integrated in a single structure; and the plurality of first sensors and the plurality of touch simulating elements are interspersed with each other.

In another, aspect, the present invention provides a method for haptic communication, comprising connecting a touch simulation device and a touch sensing device at different locations to a computer network; detecting a touch signal using the touch sensing device; converting the touch signal into the first touch command signal; transmitting the first touch command signal to the touch simulation device; and simulating the touch on the touch simulation device in response to the first touch command signal.

Optionally, detecting a touch signal using the touch sensing device comprises acquiring a plurality of touch positions and a plurality of touch signals respectively from a plurality of touch positions; the method further comprises framing the plurality of touch signals respectively from the plurality of touch positions into the first touch command signal having a frame structure; and deframing the first touch command signal to obtain a plurality of touch simulating signals.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
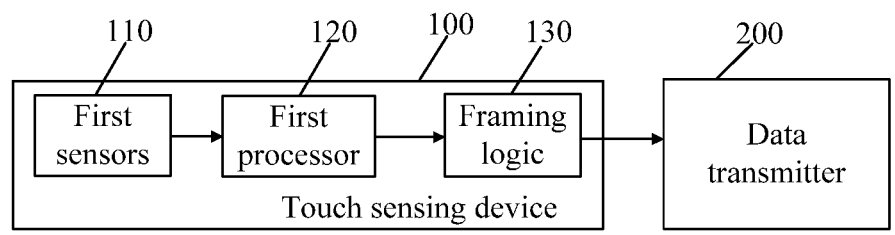
FIG. 1 is a schematic diagram illustrating the structure of a touch sensing signal acquisition module in a haptic communication apparatus in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise loan disclosed.

Communication is an essential part of people's life. Remote communication typically involves verbal and visual communication. However, conventional remote communication technology does not enable haptic communication between two users located at different locations.

Accordingly, the present invention provides, inter alia, a haptic communication apparatus, a haptic communication apparatus, and a method for haptic communication that substantially obviate one or more of the problems due to limitations and disadvantages of the related art. In one aspect, the present disclosure provides a haptic communication apparatus. In some embodiments, the haptic communication apparatus includes a touch simulation device including a first controller and a first actuator coupled to each other; and a data receiver communicatively coupled to the touch simulation device and configured to receive a first touch command signal, associated with simulating a touch on the touch simulation device. Optionally, the first controller is configured to receive the first touch command signal from the data receiver and control the first actuator to simulate the touch on the touch simulation device in response to the first touch command signal; the first actuator includes a plurality of touch simulating elements; the first controller is coupled to each of the plurality of touch simulating elements and configured to provide a plurality of touch simulating signals respectively to the plurality of touch simulating elements; and each of the plurality of touch simulating elements includes a first terminal and a second terminal, a distance between the first terminal and the second terminal capable of being actuated between a first value and a second value in response to a corresponding one of the plurality of touch simulating signals, the second value being larger than the first value. In some embodiments, the haptic communication apparatus further includes touch sensing device configured to detect a touch signal and a touch position information, and convert the touch signal and the touch position information into the first touch command signal; a data transmitter communicatively coupled to the touch sensing device and configured to receive the first touch command signal from the touch sensing device; and a communication interface configured to establish a communication link between the data receiver and the data transmitter. Optionally, the touch sensing device and the touch simulation device are at different locations and configured to be connected to a computer network. Optionally, the data transmitter is configured to communicate the first touch command signal to the data receiver via the communication link. Optionally, the touch sensing device includes a plurality of first sensors, and a first processor coupled to each of the plurality of first sensors and configured to acquire a plurality of touch signals respectively from the plurality of first sensors and a plurality of touch positions respectively corresponding to the plurality of touch signals.

FIG. 1 is a schematic diagram illustrating the structure of a touch sensing signal acquisition module in a haptic communication apparatus in some embodiments according to the present disclosure. Referring to FIG. 1, the touch sensing signal acquisition module in the haptic communication apparatus in some embodiments includes a touch sensing device 100 and a data transmitter 200. The touch sensing device is configured to detect a touch signal and a touch position information, and convert the touch signal and the touch position information into the first touch command signal. The data transmitter 200 is communicatively coupled to the touch sensing device and is configured to receive the first touch command signal from the touch sensing device, and communicate the first touch command signal to the data receiver coupled to the touch simulation device via a communication link.

In some embodiments, the touch sensing device 100 includes at least one first sensor 110 (e.g., a plurality of first sensors 110), and a first processor 120 coupled to each of the plurality of first sensors 110 and configured to acquire a plurality of touch signals respectively from the plurality of first sensors 110 and a plurality of touch positions respectively corresponding to the plurality of touch signals. The plurality of first sensors 110 may any appropriate touch sensors. In some embodiments, the plurality of touch signals are a plurality of virtual touch signals; the plurality of first sensors 110 are a plurality of virtual touch sensors, each of which is configured to detect a virtual touch and generate a virtual touch signal. The first processor 120 is coupled to each of the plurality of virtual touch sensors and configured to acquire the plurality of virtual touch signals respectively from the plurality of virtual touch sensors and a plurality of virtual touch positions respectively corresponding to the plurality of virtual touch signals. Optionally, when the virtual touch sensor is in a proximity of a virtual reality object, e.g., within a threshold distance to the virtual reality object, a virtual touch occurs, and the virtual touch sensor detects the virtual touch and generates a virtual touch signal.

In some embodiments, the plurality of touch signals are a plurality of touch pressure signals the plurality of first sensors 110 are a plurality of pressure sensors, each of which is configured to detect a pressure applied thereon and generate a touch pressure signal. In one example, the touch pressure signal contains information on the magnitude of the pressure applied on the pressure sensors. The first processor 120 is coupled to each of the plurality of pressure sensors and configured to acquire the plurality of touch pressure signals respectively from the plurality of pressure sensors and the plurality of touch positions respectively corresponding to the plurality of touch pressure signals. Optionally, the data transmitter 200 is communicatively coupled to the touch sensing device 100, and is configured to receive the first touch command signal from the touch sensing device and communicate the first touch command signal to the data receiver via the communication link. Optionally, the touch sensing device 100 and the touch simulation device are at different locations and configured to be connected to a computer network. The first touch command signal may be a signal conforming to a transmission protocol of a communication network. The haptic communication apparatus includes a communication interface configured to establish a communication link between the data receiver and the data transmitter 200. The data transmitter 200 is configured to communicate the first touch command signal to the data receiver via the communication link. Upon receiving the first touch command signal, the touch simulation device is configured to simulate a touch on the touch simulation device in response to the first touch command signal. For example, the touch simulation device may simulate a touch on a user, the simulated touch is applied on the user with a pressure corresponding to the pressure applied and detected on the pressure sensors of the touch sensing device 100.

In one exemplary application setting, the haptic communication apparatus is used by two parties, e.g., a touch transmitting user at a location A and a touch receiving user at a location B different from location A. The touch transmitting user applies a pressure on the touch sensing device 100 at the location A, the touch sensing device 100 detects a touch pressure signal and converts the touch pressure signal into a first touch command signal, and the data transmitter 200 transmits the first touch command signal to the data receiver at the location B and transmits the first touch command signal to the touch simulating device. The touch simulating device then simulates a touch, e.g., generates a deformation on the touch simulating device in response to the first touch command signal. The touch receiving user at the location B can receive a touch with a pressure corresponding to the pressure applied and detected on the pressure sensors of the touch sensing device 100 at the location A. Optionally, the pressure applied by the touch simulating device on the touch receiving user at the location B has a substantially the same magnitude as the pressure applied on the touch sensing device 100 at the location A. By pairing the touch sensing device 100 and the touch simulation device together, the touch receiving user at the location B can realistically feel the touch motion performed by the touch transmitting user at the location A.

In some embodiments, the first touch command signal contains information on the magnitude of the pressure applied on the touch sensing device 100 at the location A.

The magnitude of deformation on the touch simulation device at the location B is correlated to the magnitude of the pressure applied on the touch sensing device 100. Accordingly, the touch receiving user at the location B can feel a touch pressure corresponding to the pressure applied and detected on the pressure sensors of the touch sensing device 100 at the location A. To detect the magnitude of the pressure applied on the touch sensing device 100, the touch sensing device 100 in some embodiments includes at least one first sensors 110 (e.g., a plurality of first sensors 110).

Figure 2:
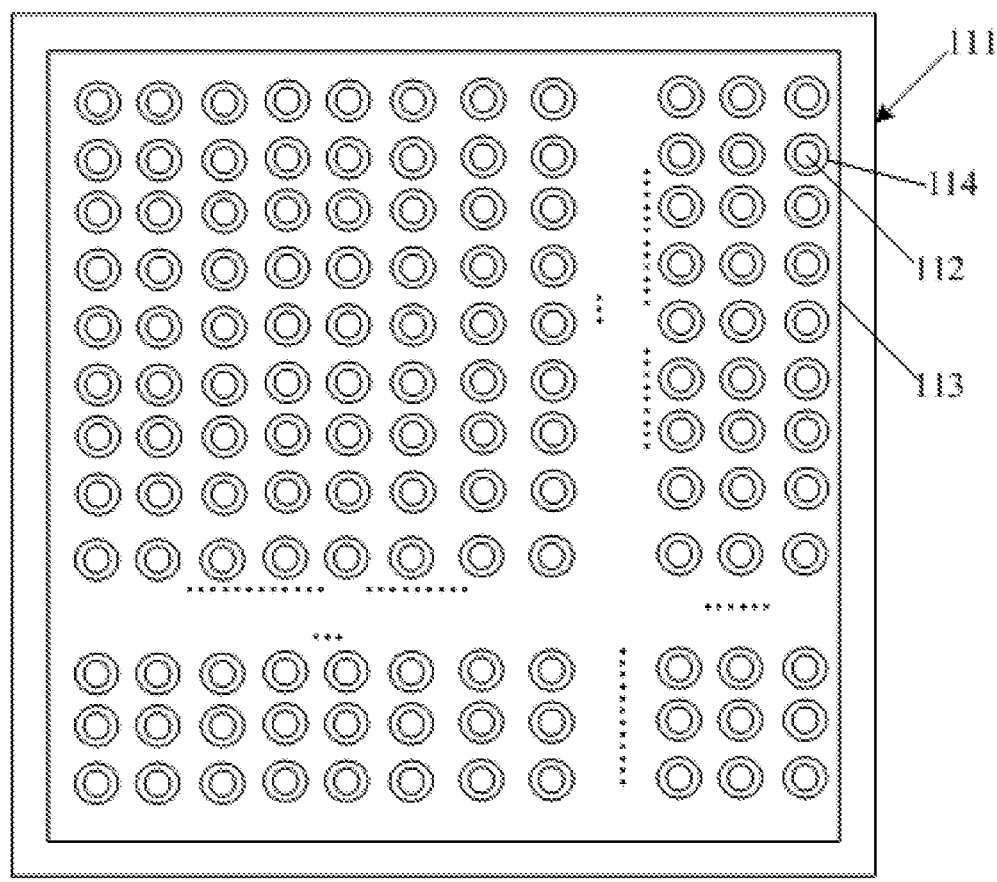
FIG. 2 is a top view of a touch sensing signal acquisition module in a haptic communication apparatus in some embodiments according to the present disclosure.
Figure 3:
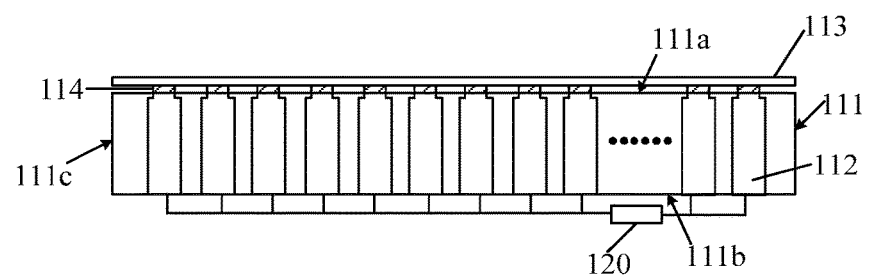
FIG. 3 is a cross-sectional view of a touch sensing signal acquisition module in a haptic communication apparatus in some embodiments according to the present disclosure.

FIG. 2 is a top view of a touch sensing signal acquisition module in a haptic communication apparatus in some embodiments according to the present disclosure. FIG. 3 is a cross-sectional view of a touch sensing signal acquisition module in a haptic communication apparatus in some embodiments according to the present disclosure. Referring to FIG. 2 and FIG. 3, the touch sensing device in some embodiments includes a plurality of pressure sensors 112. Each, of the plurality of pressure sensors 112 includes a pressure receiving surface and is configured to detect a pressure applied on the pressure receiving surface.

In some embodiments, the first touch command signal contains information on the range of the touch. Referring to FIG. 2 and FIG. 3, the touch sensing device includes an array of the plurality of pressure sensors 112 along a first direction (e.g., a row direction) and a second direction (e.g., a column direction). Each of the plurality of pressure sensors 112 may individually detect a pressure applied on its pressure receiving surface. By combining the plurality of touch pressure signals respectively from the plurality of pressure sensors 112 and the plurality of touch positions respectively corresponding to the plurality of touch pressure signals, the range of the touch can be determined, and the magnitude of the pressure applied at different positions within the range of the touch can be detected. By having this design, the simulated touch performed by the touch simulating device may be more realistic.

In some embodiments, each of the plurality of pressure sensors 112 is configured to detect a pressure applied on the pressure receiving surface periodically at time intervals. In some embodiments, each of the plurality of pressure sensors 112 is configured to detect a pressure applied on the pressure receiving surface in real time. For example, a pressure sensor 112 may be configured to detect the magnitude of an applied pressure once the touch motion starts until the touch motion ends. By having the plurality of pressure sensors 112 detect the applied pressure in real time, the plurality of pressure sensors 112 can continuously detect the variations of the magnitude of the applied pressure during a touch period from a first time point when the touch motion starts to a second time point when the touch motion ends. The touch simulating device can continuously perform a simulated touch (e.g., a deformation) corresponding to the touch motion in the touch period. By having this design, the simulated touch performed by the touch simulating device may be more realistic.

As used herein, the term "in real time" relates to a situation where an action is being performed as an event occurs. In the context of the present disclosure, the term "in real time" may include, but is not limited to, immediate, rapid, not requiring operator intervention, automatic, and/or programmed. Optionally, in real time may include detecting or measuring substantially continuously, i.e., one action is performed as soon as the previous one is finished. Optionally, in real time may include, but is not limited to, measurements or detections in femtoseconds, picoseconds, nanoseconds, milliseconds, as well as longer, a optionally shorter, time intervals.

To enhance the conversion efficiency of converting the touch pressure signals into the first touch command signal and reduce power consumption of the touch sensing signal acquisition module, the touch sensing device in some embodiments includes a first processor 120. Referring to FIG. 3, the first processor 120 is coupled to each of the plurality of pressure sensors 112 and configured to acquire the plurality of touch pressure signals (and magnitudes thereof) respectively from the plurality of pressure sensors 112 and the plurality of touch positions respectively corresponding to the plurality of touch pressure signals. Optionally, the first processor 120 is configured to acquire the plurality of touch pressure signals and the plurality of touch positions in real time. Optionally, the first processor 120 is configured to acquire the plurality of touch pressure signals and the plurality of touch positions periodically at time intervals. Each time the first processor 120 acquires the touch pressure signals, the touch pressure signals are converted into the first touch command signal, which contains the information on the magnitudes of the touch pressure signals and touch positions corresponding to the touch pressure signals. The first touch command signal is transmitted to a touch simulation module having the touch simulating device. Optionally, the first processor 120 is configured to acquire the plurality of touch pressure signals and the plurality of touch positions periodically at a relatively high frequency such that the touch simulating device appears to the simulate the touch continuously. Optionally, the first processor 120 is configured to acquire the plurality of touch pressure signals and the plurality of touch positions periodically at a frequency in a range of approximately 30 times/second and approximately 60 times/second.

In some embodiments, the touch sensing device further includes a case 111 to secure the plurality of touch pressure sensors 112. Referring to FIG. 3, the touch sensing device in some embodiments further includes a first base substrate 111a, a second base substrate 111b, and a pressure sensor layer having the plurality of the pressure sensors 112 between the first base substrate 111a and the second base substrate 111b. Optionally, the touch sensing device further includes one or more side walls 111c connecting the first base substrate 111a and the second base substrate 111b. The one or more side walls 111c, the first base substrate 111a, and the second base substrate 111b constitute the case 111. Each of the plurality of pressure sensors 112 includes a pressure receiving surface and is configured to detect a pressure applied on the pressure receiving surface. Optionally, the pressure receiving surface of each of the plurality of pressure sensors 112 is in contact with the first base substrate 111a. When the touch transmitting user applies a pressure in an area on the first base substrate 111a, each of the plurality of pressure sensors 112 within the area can individually detect a pressure at positions corresponding to its pressure receiving surface.

The plurality of pressure sensors 112 may have various appropriate arrangements in the touch sensing device. Optionally, the plurality of pressure sensors 112 are arranged in an array form. Optionally, the plurality of pressure sensors 112 have a radial distribution. Optionally, the plurality of pressure sensors 112 are arranged on a substantially planar surface, e.g., the first base substrate 111a has a substantially planar surface (see, e.g., FIG. 3). Optionally, the plurality of pressure sensors 112 are arranged on a curved surface, e.g., the first base substrate 111a has a curved suffice.

Referring to FIG. 3, the touch sensing device in some embodiments further includes an elastic material layer 113 on a side of the first base substrate 111a distal to the second base substrate 111b for, improving the sense of touch of the touch transmitting user. Optionally, the elastic material layer 113 includes a silicone layer. For example, the elastic material layer 113 may be made of a silicone material, which provides a touch sensation similar to that of a human skin. The elastic material layer 113 is made to have a certain thickness and a certain elastic coefficient such that it does not interfere with the touch pressure signal detection by the plurality of pressure sensors 112.

Referring to FIG. 3, the touch sensing device in some embodiments further includes a first pressure transferring layer having a plurality of first pressure transferring pads 114 between the first base substrate 111a and the elastic material layer 113. Each of the plurality of first pressure transferring pads 114 on a side of the pressure receiving surface of one of the plurality of pressure sensors 112 proximal to the first base substrate 111a. As shown in FIG. 3, a projection of each of the plurality of first pressure transferring pads 114 on the first base substrate 111a (or on the second base substrate 111b) is within that of the pressure receiving surface of one of the plurality of pressure sensors 112. Optionally, the plurality of first pressure transferring pads 114 are made of a rubber material. Optionally, the first base substrate 111a is an ultra-thin base substrate. Optionally, the first base substrate 111a is made of a same material as the plurality of first pressure transferring pads 114. Optionally, when the first base substrate 111a is made of a same material as the plurality of first pressure transferring pads 114, the touch sensing device does not include the plurality of first pressure transferring pads 114. Optionally, when the touch sensing device includes the plurality of first pressure transferring pads 114, the touch sensing device does not include a first base substrate.

In some embodiments, the first touch command signal has a frame structure. Referring to FIG. 1, the touch sensing device 100 in some embodiments further includes a framing logic 130 coupled to the first processor 120 and the data transmitter 200 and configured to frame the plurality of touch signals respectively from the plurality of first sensors 110 acquired by the first processor 120 into the first touch command signal having a frame structure, and transmit the first touch command signal to the data transmitter 200. Optionally, the first touch command signal is transmitted to the touch simulating module through a communication network. Optionally, the first touch command signal has a frame structure conforming to a communication protocol of the communication network. The first touch command signal includes a plurality of frames of touch command signals. Every time the first processor 120 acquires a plurality of touch signals respectively from the plurality of first sensors 110, the framing unit 130 generates a frame structure. For example, the first processor 120 is configured to acquire the plurality of touch pressure signals and the plurality of touch positions periodically at a frequency of N times/second, the framing unit 130 generates N frames structures per second.

As used herein, the term refers to hardware (e.g. a board, circuit, chip, etc.), software and/or firmware configured to carry out operations according to the invention. For instance, features of the invention may be accomplished by specific circuits under control of a computer program or program modules stored on a suitable computer-readable medium, where the program modules are configured to control the execution of memory operations using the circuitry of an interface.

Figure 4:
FIG. 4 is a schematic diagram illustrating a frame structure of a touch command signal in some embodiments according to the present disclosure.

FIG. 4 is a schematic diagram illustrating a frame structure of a touch command signal in some embodiments according to the present disclosure. Referring to FIG. 4, the frame structure in some embodiments includes a frame start flag field STA, a frame identifier field NUM, a group of the plurality of touch simulating signals (L11-Lmn), a frame Check sequence field CRC, and a frame end flag field STO. The frame identifier field NUM can be used by a deframer to arrange a plurality of frames of touch command signals in a sequential order. The croup of the plurality of touch simulating signals includes a plurality of touch simulating signals in a certain order, e.g., a consecutive order from L11 to Lmn, as shown in FIG. 4.

In one example, the touch sensing device includes an array of the plurality of pressure sensors 112 along a first direction and a second direction. For example, the array may include a plurality of rows and a plurality of columns of pressure sensors 112. The plurality of touch simulating signals in the group of the plurality of touch simulating signals may be arranged in an order accordingly to their positions in the array, e.g., row-by-row, or column-by-column. Optionally, the touch simulating signals in the group may be arranged in a row-by-row order, for example, starting from a first touch simulating signals corresponding to the first pressure sensor 112 in the first row of the array to a last touch simulating signals L1n corresponding to the last pressure sensor 112 in the first row of the array; continuing to a first touch simulating signals L21 corresponding to the first pressure sensor 112 in the second row of the array to a last touch simulating signals L2n corresponding to the last pressure sensor 112 in the second row of the array; and continuing on in a same fashion to the last row, from a first touch simulating signals Lm1 corresponding to the first pressure sensor 112 in the last row of the array to a last touch simulating signals Lnm corresponding to the last pressure sensor 112 in the last row of the array.

Optionally, the touch sensing device is a wearable device. Examples of appropriate wearable devices include, but are not limited to, a smart glove, a wearable apparatus that is worn on clothing, a wearable apparatus that when worn contacts human skin, an electronic tattoo.

Figure 5:
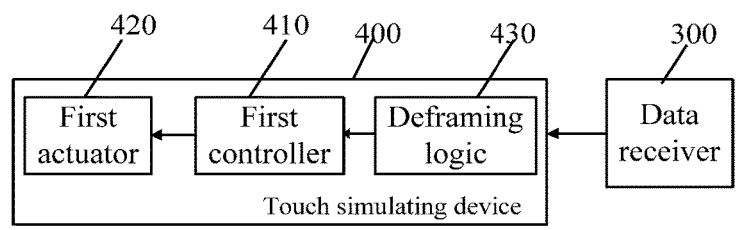
FIG. 5 is a schematic diagram illustrating the structure of a touch simulation module in a haptic communication apparatus in some embodiments according to the present disclosure.

FIG. 5 is a schematic diagram illustrating the structure of a touch simulation module in a haptic communication apparatus in some embodiments according to the present disclosure. Referring to FIG. 5, the touch simulation module in a haptic communication apparatus in some embodiments includes a data receiver 300 and a touch simulating device 400. The data receiver 300 is communicatively coupled to the touch simulating device 400 and is configured to receive the first touch command signal associated with simulating a touch on the touch, simulation device, e.g., transmitted from the touch sensing module via the communication link. The touch simulating device 400 is coupled to the data receiver 300 and is configured to simulate the touch on the touch simulation device in response to the first touch command signal, e.g., generate a deformation on the touch simulating device in response to the first touch command signal. The touch receiving user can receive a touch with a pressure corresponding to, the pressure applied and detected on the pressure sensors of the touch sensing device. Optionally, the pressure applied by the touch simulating device 400 on the touch receiving user has a substantially, the same magnitude as the pressure applied on the touch sensing device. By pairing the touch sensing device and the touch simulation device 400 together, the touch receiving user can realistically feel the touch motion performed by the touch transmitting User at a different location.

Referring to FIG. 5, the touch simulation device 400 in some embodiments includes a first controller 410 and a first actuator 420 coupled to each other. The first controller 410 is configured to receive the first touch command signal from the data receiver 300 and control the first actuator 420 to simulate the touch on the touch simulation device 400 in response to the first touch command signal.

Figure 6:
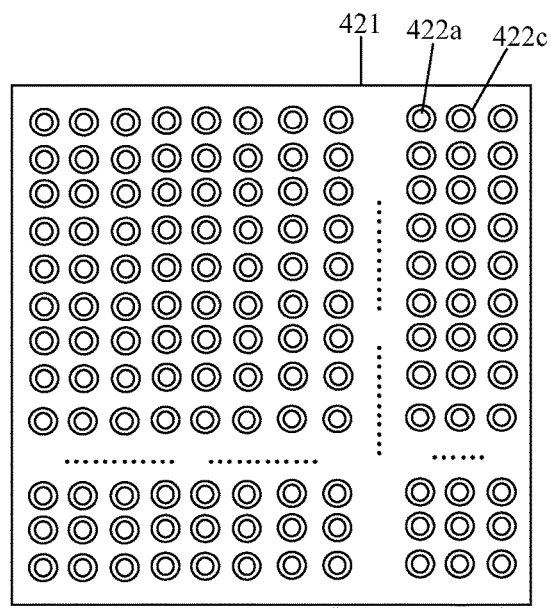
FIG. 6 is a top view of a touch simulation module in a haptic communication apparatus in some embodiments according to the present disclosure.
Figure 7:
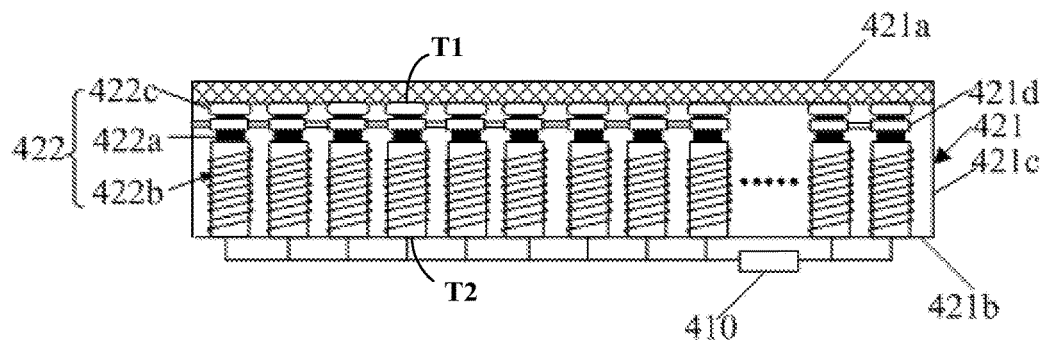
FIG. 7 is a cross-sectional view of a touch simulation module in a haptic communication apparatus in some embodiments according to the present disclosure.

FIG. 6 is a top view of a touch simulation module in a haptic communication apparatus in some embodiments according to the present disclosure. FIG. 7 is a cross-sectional view of a touch simulation module in a haptic communication apparatus in some embodiments according to the present disclosure. Referring to FIG. 6 and FIG. 7, the first actuator 420 in some embodiments includes at least one touch simulating element 422, e.g., a plurality of touch simulating elements 422. The first controller 410 is coupled to each of the plurality of touch simulating elements 422 and configured to provide a plurality of touch simulating signals respectively to the plurality of touch simulating elements 422. Each of the plurality of touch simulating elements 422 includes a first terminal T1 and a second terminal T2. A distance between the first terminal T1 and the second terminal T2 is capable of being actuated between a first value and a second value in response to a corresponding one of the plurality of touch simulating signals, the second value being larger than the first value.

Referring to FIG. 6 and FIG. 7, the touch simulation device 400 in some embodiments includes a case 421. In some embodiments, the touch simulation device 400 includes a third base substrate 421a, a fourth base substrate 421b, and an actuator layer including the plurality of touch simulating elements 422 between the third base substrate 421a and the fourth base substrate 421b. Optionally, the first terminal of each of the plurality of touch simulating elements 422 is coupled to the third base substrate 421a. Optionally, the second terminal of each of the plurality of touch simulating elements 422 is fixedly positioned with respect to the fourth base substrate 421b. Optionally, the third base substrate 421a is an elastic base substrate and is capable of undergoing deformation in response to a change in the distance between the first terminal and the second terminal. Optionally, the third base substrate 421a includes a silicone material. Optionally, the touch simulation device 400 further includes one or more side walls 421c connecting the third base substrate 421a and the fourth base substrate 421b. The one or more side walls 421c, the third base substrate 421a, and the fourth base substrate 421b constitute the case 421. Optionally, the one or more side walls 421c encloses the plurality of touch simulating elements 422 in the case 421. In some embodiments, the first controller 410 is configured to provide a plurality of touch simulating signals respectively to the plurality of touch simulating elements 422, and a distance between the first terminal and the second terminal is capable of being actuated between a first value and a second value in response to a corresponding one of the plurality of touch simulating signals, the second value being larger than the first value. Optionally, the distance between the first terminal and the second terminal increases in response to a touch simulating signal applied on the touch simulating element 422. The increase in the distance results in a deformation at a corresponding position on the third base substrate 421a. Optionally, the magnitude of the deformation is correlated to a pressure applied on the pressure receiving surface of a corresponding first sensor in the touch sensing device. When the first controller 410 provides a touch simulating signal to a touch simulating element 422, a portion of the third base substrate 421a protrudes outwards at a position corresponding to the touch simulating element 422. When the touch receiving user's body parts (e.g., a palm) is in contact with the third base substrate 421a, the touch receiving user feels the pressure resulting from the deformation (e.g., the protrusion), thereby achieving haptic communication.

Optionally, the third base substrate 421a may be made of a silicone material, which provides a touch sensation similar to that of a human skin and a more realistic haptic communication experience.

In some embodiments, the touch sensing device includes a plurality of first sensors (e.g., a plurality of pressure sensors) disposed in a case so that the touch sensing device may detect the range of the touch motion as well as the magnitude of pressure at various positions within the range of the touch motion. Correspondingly, the first actuator 420 in some embodiments includes a plurality of touch simulating elements 422. In some embodiments, the plurality of touch simulating elements 422 respectively correspond to the plurality of first sensors, and a position of each of the plurality of touch simulating elements 422 in the case 421 of touch simulation device 400 corresponds to a position of one of the plurality of first sensors in the case of the touch sensing device, e.g., in a one-to-one relationship. Optionally, a position of each of the plurality of touch simulating elements 422 in the case 421 of touch simulation device 400 corresponds to an equivalent position of one of the plurality of first sensors in the case of the touch sensing device. For example, when the case 421 of touch simulation device 400 and the case of the touch sensing device are of a same shape and same dimensions, the relative position of each of the plurality of touch simulating elements 422 in the case 421 of touch simulation device 400 corresponds to a same relative position of one of the plurality of first sensors in the case of the touch sensing device. In a pair of corresponding first sensor in the touch sensing device and touch simulating element 422 in the touch simulating device, the larger the pressure applied on the first sensor, the larger the increase in the distance between the first terminal and the second terminal of the corresponding touch simulating element 422. The larger the increase in the distance between the first terminal and the second terminal, the larger the pressure simulated on the corresponding touch simulating element 422, e.g., the larger the pressure felt by the touch receiving user.

In some embodiments, the touch sensing device includes an array of a plurality of first sensors along a first direction and a second direction, e.g., including a plurality of rows and a plurality of columns of first sensors. Optionally, the first base substrate in contact with the plurality of first sensors has a substantially planar surface. Correspondingly, as shown in FIG. 7, the touch simulating device includes an array of a plurality of touch simulating elements 422 along a first direction and a second direction, e.g., including a plurality of rows and a plurality of columns of touch simulating elements 422. Optionally, the third base substrate 421a in contact with the plurality of touch simulating elements 422 also has a substantially planar surface.

Optionally, the first base substrate in the touch sensing device has a shape complementary to that of the third base substrate 421a of the touch simulating device 400. Optionally, the first base substrate in the touch sensing device has a convex curved surface and the third base substrate 421a of the touch simulating device 400 has a concave curved surface complementary to the convex curved surface of the first base substrate in the touch sensing device. Optionally, the first base substrate in the touch sensing device has a concave curved surface and the third base substrate 421a of the touch simulating device 400 has a convex curved surface complementary to the concave curved surface of the first base substrate in the touch sensing device.

Optionally, the first base substrate in the touch sensing device has a substantially the same shape as that of the third base substrate 421a of the touch simulating device 400.

Optionally, the first base substrate in the touch sensing device has a shape similar to (e.g., substantially the same as) that of a body part of a human, e.g., hands, arms, and legs. Optionally, the first base substrate in the touch sensing device has a shape substantially complementary to that of a body part of a human, e.g., hands, arms, and legs.

Optionally, the third base substrate 421a of the touch simulating device has a shape similar to (e.g. substantially the same as) that of a body part of a human. e.g., hands, arms, and legs. Optionally, the third base substrate 421a of the touch simulating device has a shape substantially complementary to that of a body part of a human, e.g., hands, arms, and legs.

In some embodiments, each of the plurality of touch simulating elements 422 includes a first portion having a first end and a second end, and a second portion having a third end and a fourth end. Optionally, the first end of the first portion corresponds to the first terminal of each of the plurality of touch simulating elements 422, e.g., the first end of the first portion is in contact with the third base substrate 421a. Optionally, the fourth end of the second portion corresponds to the second terminal of each of the plurality of touch simulating elements 422, e.g., the fourth end of the second portion is in contact with the fourth base substrate 421b. Optionally, the second end of the first portion and the third end of the second portion are between the first end of the first portion and the fourth end of the second portion, and a distance between the second end of the first portion and the third end of the second portion can be actuated between a third value and a fourth value in response to the corresponding one of the plurality of touch simulating signals, the fourth value being larger than the third value. Optionally, the second end of the first portion and the third end of the second portion are in contact with each other absent a first touch command signal from the first controller, and the third value is substantially zero. When the touch simulating element 422 receives a first touch command signal from the first controller, the distance between the second end of the first portion and the third end of the second portion can be actuated between zero and the fourth value, e.g., the second portion is spaced apart from the first portion.

Referring to FIG. 7, the first portion in some embodiments includes a magnetic portion 422a, two ends of the magnetic portion 422a corresponding to the first end and the second end of the first portion. Optionally, one end of the magnetic portion 422a (e.g., the end proximal to the third base substrate 421a) is the first terminal of the touch simulating element. The second portion is an electromagnet 422b including a core and a coil surrounding the core, two ends of the core corresponding to the third end and the fourth end of the second portion, and the coil is electrically connected to the first controller. Optionally, the magnetic portion 422a is supported on one end of the core, the other end of the core (e.g., the end proximal to the fourth base substrate 421b) is fixedly positioned with respect to the fourth base substrate 421b. The second end of the magnetic portion 422a and the third end of the core have a same magnetic polarity upon receiving one of the plurality of touch simulating signals from the first controller.

In some embodiments, the first touch command signal includes an electrical signal causing a current passing through the coil and generating a magnetic field in an area surrounded by the coil. The core is magnetized by the magnetic field. Because the magnetic portion 422a and the electromagnet 422b are configured so that the second end of the magnetic portion 422a and the third end of the core have a same magnetic polarity when the coil receives one of the plurality of touch simulating signals, the repulsion force between the magnetic portion 422a and the core drives the magnetic portion 422a moving away from the core. The movement of the magnetic portion 422a deforms a portion of the third base substrate 421a at a position corresponding to the magnetic portion 422a. The touch receiving user feels a pressure caused by the deformation when the touch receiving user touches the touch simulating device 400. The larger the current passing through the coil, the greater the velocity and moving distance of the core, and the greater the pressure felt by the touch receiving user. Absent the first touch command signal from the first controller, no current passes through the coil, the magnetic field is not generated in the area surrounded by the coil, and the core is not magnetized. Optionally, the magnetic portion 422a is supported on the core absent the first touch command signal from the first controller due to gravity, and the third base substrate 421a resumes an initial state (e.g., an un-deformed state). When the first controller provides the first touch command signal to the coil, the magnetic portion 422a is driven by the repulsion force to move away from the core with a certain velocity, which results in an impact on the third base substrate 421a, resulting in a more realistic simulated touch.

When in use, the case 421 of the touch simulating device 400 may be placed on a fixed platform. The third base substrate 421a is a top wall, and the fourth base substrate 421b is a bottom wall, the one and more side walls 421c connecting the top wall and the bottom wall.

Referring to FIG. 7, the touch simulation device in some embodiments further includes a retaining layer having a plurality of retaining portions 421d (e.g., a tube), each of which having a through-hole allowing the first portion of one of the plurality of touch simulating elements (e.g., the magnetic portion 422a) to extend through the through hole and be movable relative to the through-hole along a direction substantially parallel to a central axis of the through-hole in response to the corresponding one of the plurality of touch simulating signals. Optionally, the plurality of retaining portions 421d are fixedly interconnected and the retaining layer is securely attached to the one or more side walls 421c. By having the retaining layer, the movement of the magnetic portion 422a along directions other than the direction substantially parallel to a central axis of the through-hole is restricted. For example, the magnetic portion 422a may be allowed to move upwards and downwards, but horizontal movements of the magnetic portion 422a are limited by the retaining portion 421d. By having this design, it can be ensured that the magnetic portion 422a stays on top of the core. To avoid or reduce resistance between the magnetic portion 422a and the retaining portion 421d during the movement of the magnetic portion 422a, the through-hole may be made to have a diameter larger than that of the magnetic portion 422a. Optionally, a ratio of the diameter of the through-hole to the diameter of the magnetic portion 422a is in a range of approximately 1.2 to approximately 1.4.

Referring to FIG. 7, the touch simulation device in some embodiments further includes a second pressure transferring layer having a plurality of second pressure transferring pads 422c between the third base substrate 421a and the actuator layer. Optionally, each of the plurality of second pressure transferring pads 422c is on a side of the first end of the first portion (e.g., the magnetic portion 422a) of one of the plurality of touch simulating elements proximal to the third base substrate 421a. The second pressure transferring pads 422c transfer the pressure produced by the touch simulating elements 422 to the third base substrate 421a. Optionally, the plurality of second pressure transferring pads 422c are made of a rubber material.

In some embodiments, the first touch, command signal has a frame structure. Referring to FIG. 5, the touch simulation device 400 in some embodiments further includes a deframing logic 430 coupled to the first controller 410 and the data receiver 300 and configured to deframe the first touch command signal received by the data receiver 300 to obtain the plurality of touch simulating signals and transmit the plurality of touch simulating signals to the first controller 410.

In some embodiments, the frame structure includes a frame start flan field STA, a frame identifier field NUM, a group of the plurality of touch simulating signals (L11-Lmn), a frame cheek sequence field CRC, and a frame end flag field STO. In some embodiments, the first touch command signal has a frame structure and includes a plurality of frames of touch simulating signals. Optionally, each of the plurality of frames includes a frame start flag field STA, a frame identifier field NUM, a group of the plurality of touch simulating signals (L11-Lmn), a frame check sequence field CRC, and a frame end flag field STO. The group of the plurality of touch simulating signals includes a plurality of touch simulating signals in a consecutive order. Optionally, the deframing logic includes a determination sub-logic configured to detect a corrupted data in each of the plurality of frames based on the frame check sequence field, and a deframing sub-logic coupled to the determination sub-logic. When the determination sub-logic detects the corrupted data, it transmits a first signal to the deframing, sub-logic indicating that the corrupted data is detected, and the deframing sub-logic is configured to discard a frame of touch simulating signals based on the first signal. When determination sub-logic does not detect a corrupted data, it transmits a second signal to the deframing sub-logic indicating that a corrupted data is not detected, and the deframing sub-logic is configured to deframe signals in the frame of touch simulating signals based on the second signal. When an error occurs during data transmission process, the deframing logic is able to detect the corrupted data and discard it, preventing any abrupt and abnormal movements from being performed by the touch simulating device from.

Optionally, the touch simulation device is a wearable device. Examples of appropriate wearable devices include, but are not limited to, a smart glove, a wearable apparatus that is worn on clothing, a wearable apparatus that when worn contacts human skin, an electronic tattoo.

In some embodiments, the touch simulating device is capable of detecting a touch signal and convert the plurality of touch signals into a second touch command signal. For example, the touch simulation device is capable of perform both a touch simulation function and a touch detection function. Optionally, the touch simulation device is capable of perform both a touch simulation function and a touch detection function simultaneously. Accordingly, in some embodiments, the touch simulation device further includes various components of the touch sensing device as described herein (e.g., the touch sensing device 100 in FIG. 1).

Optionally, the touch simulation device further includes a plurality of second sensors, and a second processor coupled to each of the plurality of second sensors and configured to acquire a plurality of touch signals respectively from the plurality of second sensors and a plurality of touch positions respectively corresponding to the plurality of touch signals. Optionally, the touch simulation device further includes a data transmitter communicatively coupled to the plurality of second sensors and configured to receive the plurality of touch signals from the plurality of second sensors, convert the plurality of touch signals into a second touch command signal, and communicate the second touch command signal via the communication link. Optionally, the data receiver of the touch simulating device is a data transceiver communicatively coupled to the plurality of second sensors and configured to receive the plurality of touch signals from the plurality of second sensors, convert the plurality of touch signals into a second touch command signal, and communicate the second touch command signal via the communication link.

In some embodiments, the touch sensing device is capable of simulating a touch on the touch sensing device. For example, the touch sensing device is capable of perform both a touch detection function and a touch simulation function. Optionally, the touch sensing device is capable of perform both a touch detection function and a touch simulation function simultaneously. Accordingly, in some embodiments, the touch sensing device further includes various components of the touch simulating device as described herein (e.g., the touch simulating device 400 in FIG. 5). Optionally, the touch sensing device further includes a second controller and a second actuator coupled to each other. Optionally, the touch sensing device further includes a data receiver communicatively coupled to the second controller and configured to receive a second touch command signal associated with simulating the touch on the touch sensing device. Optionally, the data transmitter of the touch sensing device is a data transceiver communicatively coupled to the second controller and configured to receive a second touch command signal associated with simulating the touch on the touch sensing device. Optionally, the second controller is configured to receive the second touch command signal from the data receiver (or the data transceiver) of the touch sensing device and control the second actuator to simulate the touch on the touch sensing device in response to the second touch command signal.

Figure 8:
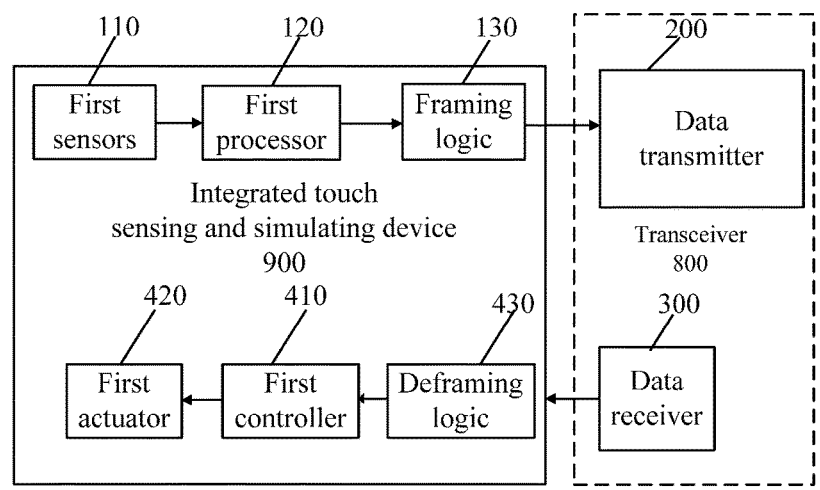
FIG. 8 is a schematic diagram illustrating the structure of an integrated touch sensing and simulation apparatus in a haptic, communication apparatus in some embodiments according to the present disclosure.

Accordingly, in some embodiments, the present disclosure further provides an integrated touch sensing and simulating device. FIG. 8 is a schematic diagram illustrating the structure of an integrated touch sensing and simulation apparatus in a haptic communication apparatus in some embodiments, according to the present disclosure. Referring to FIG. 8, the integrated touch sensing and simulation apparatus in some embodiments includes an integrated touch sensing and simulating device 900, a data transmitter 200, and a data receiver 300. Optionally, the data transmitter 200 and the data receiver 300 may be integrated into a transceiver 800. Optionally, the integrated touch sensing and simulating device 900 includes a plurality of first sensors 110, a first processor 120, a first actuator 420, and a first controller 410. Optionally, the integrated touch sensing and simulating device 900 further includes a framing logic 130 and a deframing logic 430.

In some embodiments, the integrated touch sensing and simulating apparatus includes an integrated touch sensing and simulating device 900 configured to detect a touch signal and a touch position information, convert the touch signal and the touch position information into an outgoing touch command signal, and simulate a touch; a data transmitter 200 communicatively coupled to the integrated touch sensing and simulating device 900 and configured to receive the outgoing touch command signal from the integrated touch sensing and simulating device 900 and communicate the outgoing touch command signal via a communication link; and a data receiver 300 communicatively coupled to the integrated touch sensing, and simulating device 900 and configured to receive an incoming touch command signal associated with simulating a touch on the touch simulation device. Optionally, the integrated touch sensing and simulating device 900 includes a plurality of first sensors 110; a first processor 120 coupled to each of the plurality of first sensors 110 and configured to acquire a plurality of touch signals respectively from the plurality of first sensors 110 and a plurality of touch positions respectively corresponding to the plurality of touch signals; a first actuator 420 comprising a plurality of touch simulating elements; a first controller 410 configured to receive the incoming touch command signal from the data receiver 300 and control the first actuator 420 to simulate the touch on the integrated touch sensing and simulating device 900 in response to the incoming touch command signal, the first actuator 420 and the first controller 410 coupled to each other. Optionally, the first controller 410 is coupled to each of the plurality of touch simulating elements and configured to provide a plurality of touch simulating signals respectively to the plurality of touch simulating elements. Optionally, each of the plurality of touch simulating elements includes a first terminal and a second terminal, a distance between the first terminal and the second terminal capable of being actuated between a first value and a second value in response to a corresponding one of the plurality of touch simulating signals, the second value being larger than the first value.

In some embodiments, the integrated touch sensing and simulating device 900 further includes a framing logic 130 coupled to the first processor 120 and the data transmitter 200 and configured to frame the plurality of touch signals respectively from the plurality of first sensors 110 acquired by the first processor 120 into the outgoing touch command signal having a frame structure, and transmit the outgoing touch command signal to the data transmitter 200. In some embodiments, the integrated touch sensing and simulating device 900 further includes a deframing logic 430 coupled to the first controller 410 and the data receiver 300 and configured to deframe the incoming touch command signal received by the data receiver 300 to obtain the plurality of touch simulating signals and transmit the plurality of touch simulating signals to the first controller 410.

Optionally, the plurality of first sensors and the plurality of touch simulating elements are integrated in a single structure. Optionally, the plurality of first sensors and the plurality of touch simulating elements are in a same layer, e.g., an integrated sensor and actuator layer including the plurality of first sensors and the plurality of touch simulating elements. Optionally, the integrated sensor and actuator layer includes the plurality of first sensors and the plurality of touch simulating elements interspersed with each other.

Optionally, the data transmitter 200 and the data receiver 300 are integrated into a data transceiver.

Optionally, the integrated touch sensing and simulating apparatus communicates the outgoing touch command signal via a communication link, e.g., to another integrated touch sensing and simulating apparatus at a remote location or a touch simulating module at a remote location. Optionally, the integrated touch sensing and simulating apparatus receives the incoming touch command signal via a communication link, e.g., from another integrated touch sensing and simulating apparatus at a remote location or a touch sensing module at a remote location. Optionally, the integrated touch sensing and simulating apparatus further includes a communication interface configured to establish the communication link between the integrated touch sensing and simulating apparatus and a remote apparatus, e.g., another integrated touch sensing and simulating apparatus at a remote location, a touch simulating module at a remote location, or a touch sensing module at a remote location. The integrated touch sensing and simulating apparatus and the remote apparatus are connected to a computer network.

Optionally, the integrated touch sensing and simulating apparatus has a shape similar (e.g., to substantially the same as) that of a body part of a human, e.g., hands, arms, and legs. Optionally, the integrated touch sensing and simulating apparatus has a shape substantially complementary to that of a body part of a human, e.g., hands, arms, and legs.

Figure 9:
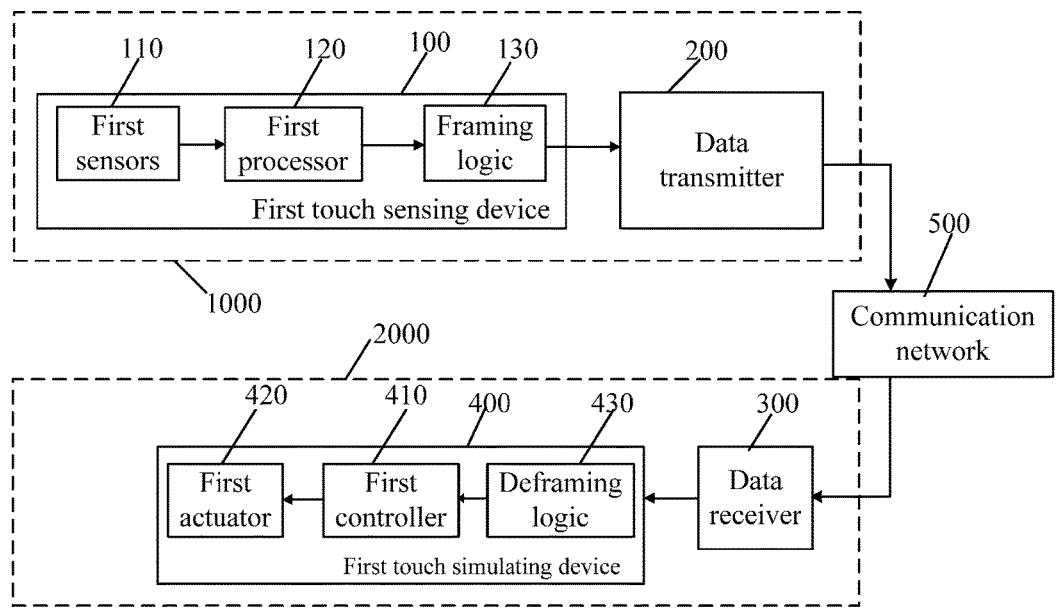
FIG. 9 is a schematic diagram illustrating the structure of a haptic communication apparatus in some embodiments according to the present disclosure.

FIG. 9 is a schematic diagram illustrating the structure of a haptic communication apparatus in some embodiments according to the present disclosure. Referring to FIG. 9, the haptic communication in some embodiments includes a first touch sensing module 1000 (e.g., a touch sensing module as shown in FIG. 1) and a first touch simulation module 2000 (e.g., a touch simulation module as shown in FIG. 5). The first touch sensing module 1000 includes a first touch sensing device 100 and a data transmitter 200. The first touch simulating module 2000 includes a first touch simulating device 400 and a data receiver 300. The touch sensing module 1000 and the touch simulation module 2000 are configured to communicate with each other through a communication network 500. Examples of communication networks include, but are not limited to, an Ethernet, e.g., a standard Ethernet (10 mbits/s), a fast Ethernet (100 mbits/s or 10 Gbit/s). The first touch command signal may be a signal conforming to a transmission protocol of a communication network, e.g., the TCP/IP protocol. For example, the framing logic 130 in the first touch sensing device 100 may be configured to frame the plurality of touch signals respectively from the plurality of first sensors acquired by the first processor into the first touch command signal having a frame structure conforming to a transmission protocol of a communication network.

In the present haptic communication apparatus, the touch sensing module 1000 detects a touch signal from a touch transmitting user, converts the touch signal into a communication signal, and communicates the signal to the touch simulating module 2000. The touch simulating module 2000 is capable of producing a deformation corresponding to the touch signal from the touch transmitting user, thereby applying the touch from the touch transmitting user on the touch receiving user. As a result, the touch receiving user at a different location can feel the touch performed by the touch transmitting user.

In some embodiments, the haptic communication apparatus further includes a second touch simulation module at a same location as the first touch sensing module 1000 (e.g., to be used by a same user). Optionally, the haptic communication apparatus further includes a second touch sensing module at a same location as the first touch simulation module 2000 (e.g., to be used by a same user). Optionally, the second touch simulation module includes a second touch simulating device and a second data receiver. Optionally, the second touch sensing module includes a second touch sensing device and a second data transmitter. The second touch simulation module and the second touch sensing module are configured to communicate with each other through the communication network 500. The haptic communication apparatus may be used by two users at two different locations. The first user at the first location can transmit a touch signal to the second user, and can also receive a simulated touch. Similarly, the second user at the second location can transmit a touch signal to the second user, and can also receive a simulated touch.

In some embodiments, the haptic communication apparatus further includes a video transmitting device and a video receiving device at a different location in communication with the video transmitting device. In some embodiments, the haptic communication apparatus further includes an audio transmitting device and an audio receiving device at a different location in communication with the audio transmitting device. Accordingly, the present haptic communication apparatus may be used for audio communication, video communication, and haptic communication.

Figure 10:
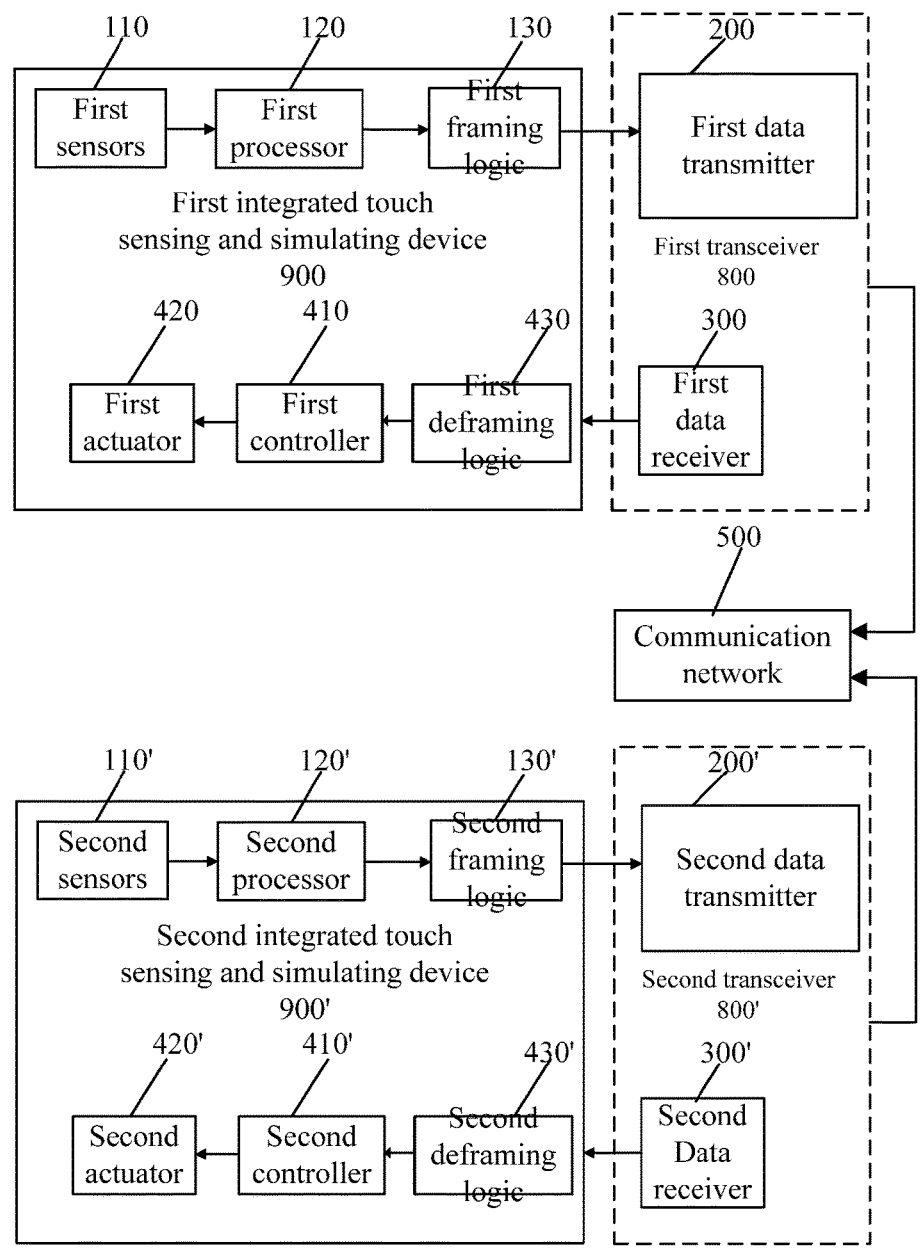
FIG. 10 is a schematic diagram illustrating the structure of a haptic communication apparatus in some embodiments according to the present disclosure.

FIG. 10 is a schematic diagram illustrating the structure of a haptic communication apparatus in some embodiments according to the present disclosure. Referring to FIG. 10, the haptic communication in some embodiments includes a first integrated touch sensing and simulating apparatus and a second integrated touch sensing and simulating apparatus. The first integrated touch sensing and simulating apparatus and the second integrated touch sensing and simulating apparatus are configured to communicate with each other through a communication network 500. The first integrated touch sensing and simulation apparatus in some embodiments includes a first integrated touch sensing and simulating device 900, a first data transmitter 200, and a first data receiver 300. Optionally, the first integrated touch sensing and simulating device 900 includes a plurality of first sensors 110, a first processor 120, a first actuator 420, and a first controller 410. Optionally, the first integrated touch sensing and simulating device 900 further includes a first framing logic 130 and a first deft timing logic 430. The second integrated touch sensing and simulation apparatus in some embodiments includes a second integrated touch sensing and simulating device 900', a second data transmitter 200', and a second data receiver 300'. Optionally, the second integrated touch sensing and simulating device 900' includes a plurality of second sensors 110', a second processor 120', a second actuator 42*t*1, and a second controller 410'. Optionally, the second integrated touch sensing and simulating device 900 further includes a second framing logic 130 and a second defaming logic 430. Optionally, the first data transmitter 200 and the first data receiver 300 may be integrated into a first transceiver 800. Optionally, the second data transmitter 200' and the second data receiver 300' may be integrated into a second transceiver 800'.

Accordingly, two users at different locations may use the present apparatus and systems for haptic communication. In one example, the present apparatus and systems may be used for business meetings. The first integrated touch sensing and simulating apparatus and the second integrated touch sensing and simulating apparatus may be wearable gloves. The haptic communication apparatus may further include holographic display of meeting participants and a meeting scene through virtual reality googles). A participant to the business meeting may shake hands with a holographic image of another participant at a different location. When both participants wear the wearable gloves, they can realistically feel the handshakes. In another example, the present apparatus and systems may be used for remote surgery. The first integrated touch sensing and simulating apparatus and the second integrated touch sensing and simulating apparatus may be a wearable glove and a robotic hand. A surgeon at a location A may wear the wearable glove integrated with the first integrated touch sensing and simulating apparatus. A robotic hand at a location. B integrated with the second integrated touch sensing and simulating apparatus may operate on a patient. The haptic communication apparatus may further include holographic display of the operation as it occurs at the location B (e.g., through virtual reality googles). The doctor can realistically feel the pressure during the operation, making the surgery more accurate.

Optionally, the first integrated touch sensing and simulating apparatus has a shape complementary to that of the second integrated touch sensing and simulating apparatus. Optionally, the first integrated touch sensing and simulating apparatus has, a convex curved surface and the second integrated touch sensing and simulating apparatus has a concave curved surface complementary to the convex curved surface of the first integrated touch sensing and simulating apparatus. Optionally, the first integrated touch sensing and simulating apparatus has a concave curved surface and the second integrated touch sensing and simulating apparatus has a convex curved surface complementary to the concave curved surface of the first integrated touch sensing and simulating apparatus.

Optionally, the first integrated touch sensing and simulating apparatus has a shape substantially the same as that of the second integrated touch sensing and simulating apparatus.

Optionally, the first integrated touch sensing and simulating apparatus has a shape similar to (e.g., substantially the same as) that of a body part of a human, e.g., hands, arms, and legs. Optionally, the first integrated touch sensing and simulating apparatus has a shape substantially complementary to that of a body part of a human, e.g., hands, arms, and legs.

Optionally, the second integrated touch sensing and simulating apparatus has a shape similar to (e.g., substantially the same as) that of a body part of a human, e.g., hands, arms, and legs. Optionally, the second integrated touch sensing and simulating apparatus has a shape substantially complementary to that of a body part of a human, e.g., hands, arms, and legs.

In another aspect, the present disclosure provides a method far haptic communication. In some embodiments, the method includes connecting a touch simulation device and a touch sensing device at different locations to a computer network; detecting a touch signal using the touch sensing device; converting the touch signal into the first touch command signal; transmitting the first touch command signal to the touch simulation device; and simulating the touch on the touch simulation device in response to the first touch command signal.

In some embodiments, the method includes a touch sensing step. Optionally, the touch sensing step includes detecting a touch signal and converting the touch signal into a first touch command signal; and communicating the first touch command signal via a communication link. Optionally, the touch sensing step includes acquiring a plurality of touch positions and a plurality of touch signals respectively from the plurality of touch positions. Optionally, the touch sensing step includes detecting a virtual touch and generating a virtual touch signal. Optionally, the touch sensing step includes acquiring a plurality of virtual touch positions and a plurality of virtual touch signals respectively from the plurality of virtual touch positions. Optionally, the touch sensing step includes detecting an applied pressure and generating a touch pressure signal. Optionally, the touch sensing step, includes acquiring a plurality of touch positions and a plurality of touch pressure signals respectively from the plurality of touch positions. Optionally, the touch pressure signal contains information on a magnitude of the pressure. Optionally, the touch sensing step includes detecting the magnitude of the pressure. Optionally, the touch sensing step further includes detecting a range of the touch. Specifically, the plurality of touch positions may be arranged in an array along a first direction (e.g., a row direction) and a second direction (e.g., a column direction). Optionally, the touch sensing step includes detecting the magnitude of the pressure applied at different positions within the range of the touch. Optionally, the touch sensing step includes individually detect a pressure applied at any of the plurality of touch positions, and determining the range of the touch based on the plurality of touch pressure signals respectively from the plurality of pressure positions, and the plurality of touch positions respectively corresponding to the plurality of touch pressure signals. Optionally, the touch sensing step includes detecting an applied pressure at the touch position in real time. Optionally, the touch sensing step includes detecting an applied pressure at the touch position periodically at time intervals. Optionally, the touch sensing step includes acquiring the plurality of touch pressure signals and the plurality of touch positions periodically at time intervals. Optionally, the touch sensing step includes acquiring the plurality of touch pressure signals and the plurality of touch positions in real time.

In some embodiments, the method includes a data framing and transmitting step. Optionally, the data framing and transmitting step includes framing the plurality of touch signals respectively from the plurality of touch positions into the first touch command signal having a frame structure, and transmitting the first touch command signal. Optionally, the first touch command signal having a flame structure includes a frame start flag field, a frame identifier field, a group of the plurality of touch simulating signals, a frame check sequence field, and a frame end flag field, the group of the plurality of touch simulating signals comprising the plurality of touch simulating signals in a consecutive order. Referring to FIG. 4, the frame structure in some embodiments includes a frame start flag field STA, a frame identifier field NUM, a group of the plurality of touch simulating signals (L11-Lmn), a frame check sequence field CRC, and a frame end flag field STO. The frame identifier field NUM can be used by a deframer to arrange a plurality of frames of touch command signals in a sequential order. The group of the plurality of touch simulating signals includes a plurality of touch simulating signals in a certain order, e.g., a consecutive order from L11 to Lmn, as shown FIG. 4.

In some embodiments, the method includes a touch simulating step. Optionally, the touch simulating step includes receiving a first touch command signal associated with simulating a touch; and simulating the touch in response to the first touch command signal. Optionally, the touch simulating step is performed on a touch simulating device including a first controller and a first actuator coupled to each other. The first actuator includes a plurality of touch simulating elements. The first controller is coupled to each of the plurality of touch simulating elements and configured to provide a plurality of touch simulating signals respectively to the plurality of touch simulating elements. Optionally, each of the plurality of touch simulating elements includes a first terminal and a second terminal, a distance between the first terminal and the second terminal capable of being actuated between a first value and a second value in response to a corresponding, one of the plurality of touch simulating signals, the second value being larger than the first value. Optionally, the touch simulating device further includes a case having a first base substrate capable of undergoing a deformation at positions corresponding to the plurality of touch simulating elements.

In some embodiments, the method includes a data deframing step. Optionally, the first touch command signal has a frame structure. Optionally, the data deframing step includes deframing the first touch command signal to obtain the plurality of touch simulating signals and transmitting the plurality of touch simulating signals (e.g., to the first controller). Optionally, the first touch command signal has a frame structure and includes a plurality of frames of touch simulating signals. Optionally, each of the plurality of frames includes a frame start flag field, a frame identifier field, a group of the plurality of touch simulating signals, a frame check sequence field, and a frame end flag field, the group of the plurality of touch simulating signals including the plurality of touch simulating signals in a consecutive order. Optionally, the data deframing step includes detecting a corrupted data in each of the plurality of frames based on the frame check sequence field; and discarding a frame of touch simulating signals based on a determination that the corrupted data is detected in the frame of touch simulating signals, and deframing signals in the frame of touch simulating signals based on a determination that the corrupted data is absent in the frame of touch simulating signals.

Figure 11:
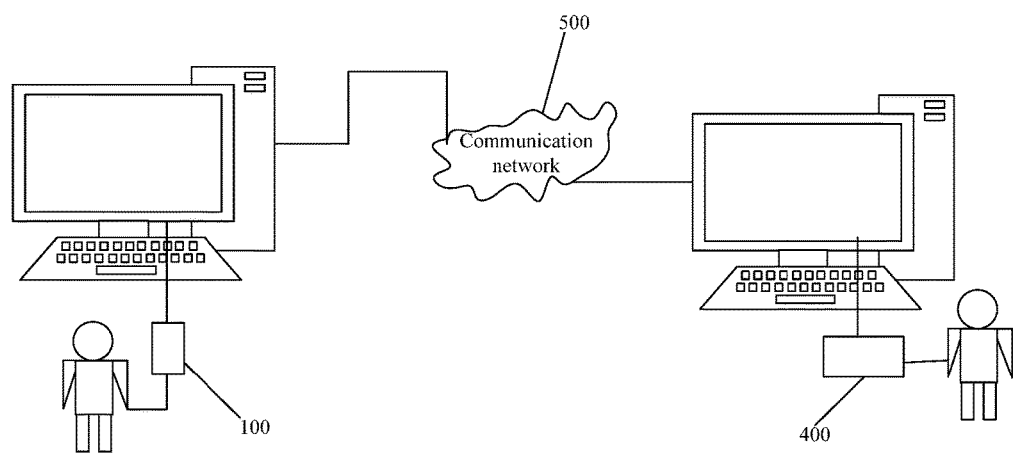
FIG. 11 is a schematic diagram illustrating an application setting, of a haptic communication apparatus in some embodiments according to the present disclosure.
Figure 12:
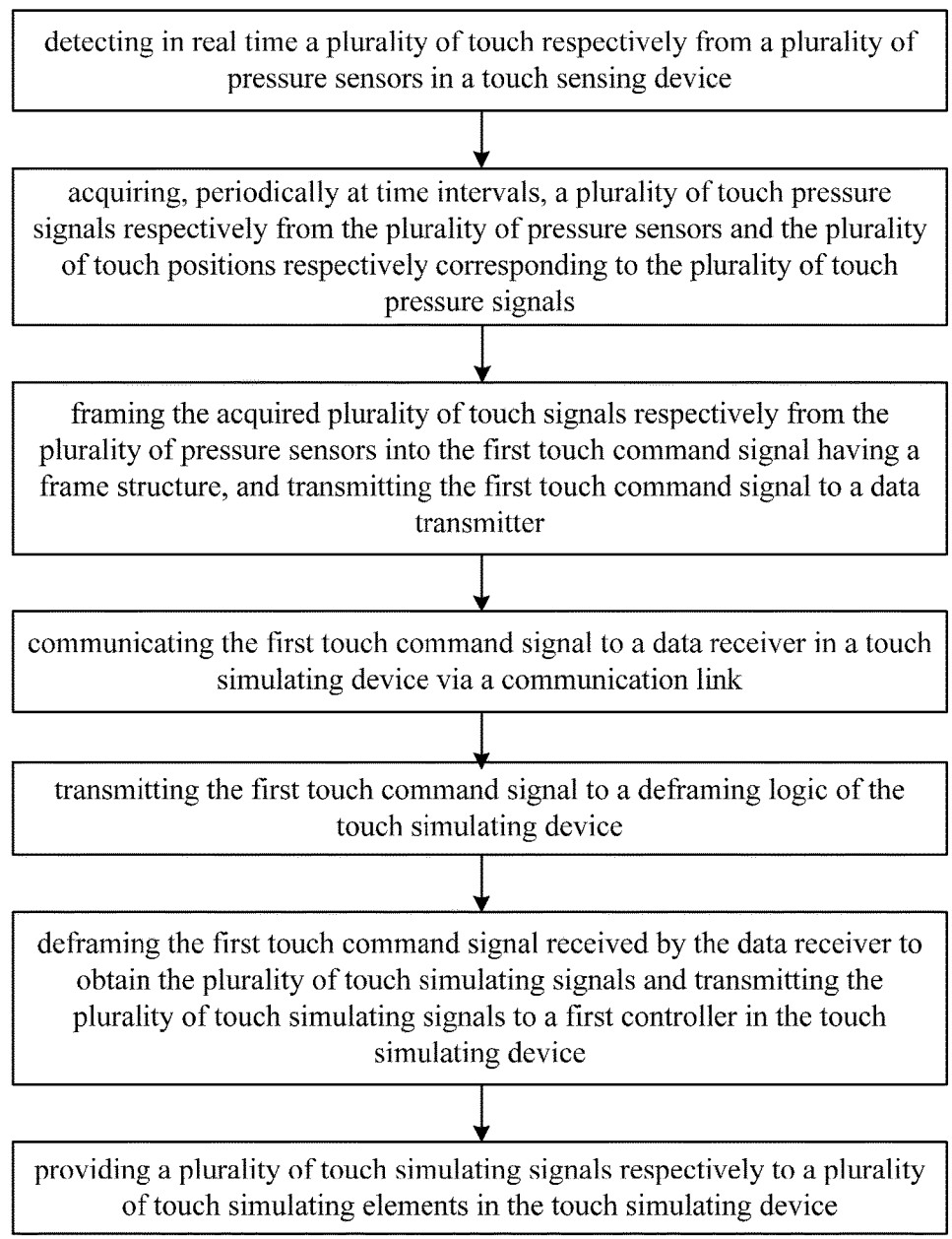
FIG. 12 is a flow chart illustrating a method for haptic communication in some embodiments according to the present disclosure.

FIG. 11 is a schematic diagram illustrating art application setting of a haptic communication apparatus in some embodiments according to the present disclosure. FIG. 12 is a flow chart illustrating a method for haptic communication in some embodiments according to the present disclosure. Referring to FIG. 11 and FIG. 12, the method for haptic communication in some embodiments includes detecting in real time a plurality of touch respectively from a plurality of pressure sensors in a touch sensing device. Optionally, the plurality of pressure sensors is disposed in a case, and the pressure is applied by a touch transmitting user on the surface of the case. Optionally, the method further includes acquiring, periodically at time intervals, a plurality of touch pressure signals respectively from the plurality of pressure sensors and the plurality of touch positions respectively corresponding to the plurality of touch pressure signals; framing the acquired plurality of touch signals respectively from the plurality of pressure sensors into the first touch command signal having a frame structure, and transmitting the first touch command signal to a data transmitter; communicating the first touch command signal to a data receiver in a touch simulating device via a communication link; transmitting the first touch command signal to a deframing logic of the touch simulating device; deframing the first touch command signal received by the data receiver to obtain the plurality of touch simulating signals and transmitting the plurality of touch simulating signals to a first controller in the touch simulating device; providing a plurality of touch simulating signals respectively to a plurality of touch simulating elements in the touch simulating device. Optionally, each of the plurality of touch simulating elements includes a first terminal and a second terminal, a distance between the first terminal and the second terminal capable of being actuated between a first value and a second value in response to a corresponding one of the plurality of touch simulating signals, the second value being larger than the first value.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many, modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A haptic communication apparatus, comprising:
a touch simulation device comprising a first controller and a first actuator coupled to each other;
a data receiver communicatively coupled to the touch simulation device and configured to receive a first touch command signal associated with simulating a touch on the touch simulation device;
a touch sensing device configured to detect a touch signal and a touch position information and convert the touch signal and the touch position information into the first touch command signal;
a data transmitter communicatively coupled to the touch sensing device and configured to receive the first touch command signal from the touch sensing device; and
a communication interface configured to establish a communication link between the data receiver and the data transmitter;
wherein the first controller is configured to receive the first touch command signal from the data receiver and control the first actuator to simulate the touch on the touch simulation device in response to the first touch command signal;
the first actuator comprises a plurality of touch simulating elements;
the first controller is coupled to each of the plurality of touch simulating elements and configured to provide a plurality of touch simulating signals respectively to the plurality of touch simulating elements;
each of the plurality of touch simulating elements comprises a first terminal and a second terminal, a distance between the first terminal and the second terminal capable of being actuated between a first value and a second value in response to one of the plurality of touch simulating signals, the second value being larger than the first value;
wherein the touch sensing device and the touch simulation device are configured to be connected to a computer network;
the data transmitter is configured to communicate the first touch command signal to the data receiver via the communication link; and
the touch sensing device comprises a plurality of first sensors, and a first processor coupled to each of the plurality of first sensors and configured to acquire a plurality of touch signals respectively from the plurality of first sensors and a plurality of touch positions respectively corresponding to the plurality of touch signals;
wherein the plurality of touch signals are a plurality of touch pressure signals;
the touch sensing device comprises a plurality of pressure sensors, each of which is configured to detect a pressure applied thereon and generate a touch pressure signal; and
the first processor is coupled to each of the plurality of pressure sensors and configured to acquire the plurality of touch pressure signals respectively from the plurality of pressure sensors and the plurality of touch positions respectively corresponding to the plurality of touch pressure signals;
wherein the touch sensing device further comprises:
a first base substrate;
a second base substrate; and
an elastic material layer on a side of the first base substrate distal to the second base substrate;
wherein the plurality of the pressure sensors are between the first base substrate and the second base substrate;
each of the plurality of pressure sensors comprises a pressure receiving surface and is configured to detect a pressure applied on the pressure receiving surface; and
the pressure receiving surface of each of the plurality of pressure sensors is in contact with the first base substrate;
wherein the touch sensing device further comprises a first pressure transferring layer comprising a plurality of first pressure transferring pads between the first base substrate and the elastic material layer; and
each of the plurality of first pressure transferring pads on a side of the pressure receiving surface of one of the plurality of pressure sensors proximal to the first base substrate.

2. The haptic communication apparatus of claim 1, wherein the touch sensing device further comprises a framing logic coupled to the first processor and the data transmitter and configured to frame the plurality of touch signals respectively from the plurality of first sensors acquired by the first processor into the first touch command signal having a frame structure, and transmit the first touch command signal to the data transmitter.

3. The haptic communication apparatus of claim 1, wherein the touch simulation device further comprises a third base substrate, a fourth base substrate, and an actuator layer comprising the plurality of touch simulating elements between the third base substrate and the fourth base substrate;
the first terminal of each of the plurality of touch simulating elements is coupled to the third base substrate;

the second terminal of each of the plurality of touch simulating elements is fixedly positioned with respect to the fourth base substrate; and the third base substrate is an elastic base substrate and is capable of undergoing deformation in response to a change in the distance between the first terminal and the second terminal.

4. The haptic communication apparatus of claim 1, wherein the touch simulation device is capable of detecting a touch signal and convert the plurality of touch signals into a second touch command signal, the touch simulation device further comprises:

a plurality of second sensors, and a second processor coupled to each of the plurality of second sensors and configured to acquire a plurality of touch signals respectively from the plurality of second sensors and a plurality of touch positions respectively corresponding to the plurality of touch signals; and the data receiver is a data transceiver communicatively coupled to the plurality of second sensors and configured to receive the second touch command signal from the touch simulation device, and communicate the second touch command signal via the communication link.

5. The haptic communication apparatus of claim 1, wherein the touch sensing device is capable of simulating a touch on the touch sensing device and further comprises:

a second controller and a second actuator coupled to each other;

the data transmitter is a data transceiver communicatively coupled to the second controller and configured to receive a second touch command signal associated with simulating the touch on the touch sensing device;

the second controller is configured to receive the second touch command signal from the data transceiver and control the second actuator to simulate the touch on the touch sensing device in response to the second touch command signal.

6. A haptic communication apparatus, comprising:

a touch simulation device comprising a first controller and a first actuator coupled to each other;

a data receiver communicatively coupled to the touch simulation device and configured to receive a first touch command signal associated with simulating a touch on the touch simulation device;

a touch sensing device configured to detect a touch signal and a touch position information and convert the touch signal and the touch position information into the first touch command signal;

a data transmitter communicatively coupled to the touch sensing device and configured to receive the first touch command signal from the touch sensing device; and a communication interface configured to establish a communication link between the data receiver and the data transmitter;

wherein the first controller is configured to receive the first touch command signal from the data receiver and control the first actuator to simulate the touch on the touch simulation device in response to the first touch command signal;

the first actuator comprises a plurality of touch simulating elements;

the first controller is coupled to each of the plurality of touch simulating elements and configured to provide a plurality of touch simulating signals respectively to the plurality of touch simulating elements; and each of the plurality of touch simulating elements comprises a first terminal and a second terminal, a distance between the first terminal and the second terminal capable of being actuated between a first value and a second value in response to one of the plurality of touch simulating signals, the second value being larger than the first value;

wherein the touch sensing device and the touch simulation device are configured to be connected to a computer network;

the data transmitter is configured to communicate the first touch command signal to the data receiver via the communication link; and the touch sensing device comprises a plurality of first sensors, and a first processor coupled to each of the plurality of first sensors and configured to acquire a plurality of touch signals respectively from the plurality of first sensors and a plurality of touch positions respectively corresponding to the plurality of touch signals;

wherein the touch sensing device further comprises a framing logic coupled to the first processor and the data transmitter and configured to frame the plurality of touch signals respectively from the plurality of first sensors acquired by the first processor into the first touch command signal having a frame structure, and transmit the first touch command signal to the data transmitter;

wherein the first touch command signal having a frame structure comprises a frame start flag field, a frame identifier field, a group of the plurality of touch simulating signals, a frame check sequence field, and a frame end flag field, the group of the plurality of touch simulating signals comprising the plurality of touch simulating signals in a consecutive order.

7. The haptic communication apparatus of claim 6, wherein the first touch command signal has a frame structure; and the touch simulation device further comprises a deframing logic coupled to the first controller and the data receiver and configured to deframe the first touch command signal received by the data receiver to obtain the plurality of touch simulating signals and transmit the plurality of touch simulating signals to the first controller.

8. The haptic communication apparatus of claim 7, wherein the first touch command signal has a frame structure and comprises a plurality of frames of touch simulating signals;

each of the plurality of frames comprises a frame start flag field, a frame identifier field, a group of the plurality of touch simulating signals, a frame check sequence field, and a frame end flag field, the group of the plurality of touch simulating signals comprising the plurality of touch simulating signals in a consecutive order;

the deframing logic comprises a determination sub-logic configured to detect a corrupted data in each of the plurality of frames based on the frame check sequence field; and the deframer logic further comprises a deframing sub-logic configured to discard a frame of touch simulating signals based on a determination that the corrupted data is detected in the frame of touch simulating signals, and deframe signals in the frame of touch simulating signals based on a determination that the corrupted data is absent in the frame of touch simulating signals.

9. A haptic communication apparatus, comprising:
a touch simulation device comprising a first controller and a first actuator coupled to each other; and
a data receiver communicatively coupled to the touch simulation device and configured to receive a first touch command signal associated with simulating a touch on the touch simulation device;
wherein the first controller is configured to receive the first touch command signal from the data receiver and control the first actuator to simulate the touch on the touch simulation device in response to the first touch command signal;
the first actuator comprises a plurality of touch simulating elements;
the first controller is coupled to each of the plurality of touch simulating elements and configured to provide a plurality of touch simulating signals respectively to the plurality of touch simulating elements; and
each of the plurality of touch simulating elements comprises a first terminal and a second terminal, a distance between the first terminal and the second terminal capable of being actuated between a first value and a second value in response to one of the plurality of touch simulating signals, the second value being larger than the first value;
wherein the touch simulation device further comprises a third base substrate, a fourth base substrate, and an actuator layer comprising the plurality of touch simulating elements between the third base substrate and the fourth base substrate;
the first terminal of each of the plurality of touch simulating elements is coupled to the third base substrate;
the second terminal of each of the plurality of touch simulating elements is fixedly positioned with respect to the fourth base substrate; and
the third base substrate is an elastic base substrate and is capable of undergoing deformation in response to a change in the distance between the first terminal and the second terminal;
wherein each of the plurality of touch simulating elements comprises a first portion having a first end and a second end, and a second portion having a third end and a fourth end;
the first end of the first portion corresponds to the first terminal of each of the plurality of touch simulating elements;
the fourth end of the second portion corresponds to the second terminal of each of the plurality of touch simulating elements;
the second end of the first portion and the third end of the second portion are between the first end of the first portion and the fourth end of the second portion; and
a distance between the second end of the first portion and the third end of the second portion capable of being actuated between a third value and a fourth value in response to a corresponding one of the plurality of touch simulating signals, the fourth value being larger than the third value.

10. The haptic communication apparatus of claim 9, further comprising:
a touch sensing device configured to detect a touch signal and a touch position information and convert the touch signal and the touch position information into the first touch command signal;
a data transmitter communicatively coupled to the touch sensing device and configured to receive the first touch command signal from the touch sensing device; and
a communication interface configured to establish a communication link between the data receiver and the data transmitter;
wherein the touch sensing device and the touch simulation device are configured to be connected to a computer network;
the data transmitter is configured to communicate the first touch command signal to the data receiver via the communication link; and
the touch sensing device comprises a plurality of first sensors, and a first processor coupled to each of the plurality of first sensors and configured to acquire a plurality of touch signals respectively from the plurality of first sensors and a plurality of touch positions respectively corresponding to the plurality of touch signals.

11. The haptic communication apparatus of claim 10, wherein the plurality of touch signals are a plurality of virtual touch signals;
each of the plurality of first sensors is configured to detect a virtual touch and generate a touch signal; and
the first processor is coupled to each of the plurality of first sensors and configured to acquire the plurality of touch signals respectively from the plurality of first sensors and a plurality of virtual touch positions respectively corresponding to the plurality of touch signals.

12. The haptic communication apparatus of claim 10, wherein the plurality of touch signals are a plurality of touch pressure signals;
the touch sensing device comprises a plurality of pressure sensors, each of which is configured to detect a pressure applied thereon and generate a touch pressure signal; and
the first processor is coupled to each of the plurality of pressure sensors and configured to acquire the plurality of touch pressure signals respectively from the plurality of pressure sensors and the plurality of touch positions respectively corresponding to the plurality of touch pressure signals.

13. The haptic communication apparatus of claim 12, wherein each of the plurality of pressure sensors comprises a pressure receiving surface and is configured to detect a pressure applied on the pressure receiving surface in real time; and
the first processor is configured to acquire the plurality of touch pressure signals and the plurality of touch positions periodically at time intervals.

14. The haptic communication apparatus of claim 12, wherein the touch sensing device further comprises:
a first base substrate; and
a second base substrate;
wherein the plurality of the pressure sensors are between the first base substrate and the second base substrate;
each of the plurality of pressure sensors comprises a pressure receiving surface and is configured to detect a pressure applied on the pressure receiving surface; and
the pressure receiving surface of each of the plurality of pressure sensors is in contact with the first base substrate.

15. The haptic communication apparatus of claim 14, wherein the touch sensing device further comprises:
an elastic material layer on a side of the first base substrate distal to the second base substrate.

16. The haptic communication apparatus of claim 9, wherein the first touch command signal is an electrical signal;

the first portion comprises a magnetic portion, two ends of the magnetic portion corresponding to the first end and the second end of the first portion;

the second portion is an electromagnet comprising a core and a coil surrounding the core, two ends of the core corresponding to the third end and the fourth end of the second portion; the coil is electrically connected to the first controller; and the second end of the magnetic portion and the third end of the core have a same magnetic polarity upon receiving one of the plurality of touch simulating signals from the first controller.

17. The haptic communication apparatus of claim 9, wherein the touch simulation device further comprises a retaining layer comprising a plurality of retaining portions, each of which having a through-hole allowing the first portion of one of the plurality of touch simulating elements to extend through the through-hole and be movable relative to the through-hole along a direction substantially parallel to a central axis of the through-hole in response to the corresponding one of the plurality of touch simulating signals.

* * * * *